United States Patent [19]

Adriaenssens

[11] Patent Number: 5,568,853
[45] Date of Patent: Oct. 29, 1996

[54] TRANSMISSION UNIT FOR MOTOR VEHICLES

[75] Inventor: Frank C. M. Adriaenssens, Bertem, Belgium

[73] Assignee: VCST, naamloze vennootschap, Sint-Truiden, Belgium

[21] Appl. No.: 501,876

[22] Filed: Jul. 13, 1995

[30] Foreign Application Priority Data

Jul. 13, 1994 [BE] Belgium ................ 09400654

[51] Int. Cl.⁶ .................... F16D 25/0638; F16H 9/00
[52] U.S. Cl. ............... 192/85 AA; 192/106 F; 474/1
[58] Field of Search ............... 192/48.91, 51, 192/85 AA, 87.15, 106 F; 474/1; 475/210

[56] References Cited

U.S. PATENT DOCUMENTS

| | | | |
|---|---|---|---|
| 3,974,743 | 8/1976 | Ivey | 192/106 F X |
| 4,543,852 | 10/1985 | Svab et al. | 475/210 |
| 4,946,423 | 8/1990 | van Beek | 474/25 |
| 5,176,579 | 1/1993 | Ohsono et al. | 474/1 |

FOREIGN PATENT DOCUMENTS

| | | |
|---|---|---|
| 0329205 | 8/1989 | European Pat. Off. . |
| 414295 | 2/1991 | European Pat. Off. . |
| 3624215 | 1/1988 | Germany . |

*Primary Examiner*—Richard M. Lorence
*Attorney, Agent, or Firm*—Bacon & Thomas

[57] ABSTRACT

Transmission unit for motor vehicles of the type which is provided with a continuously variable transmission (3), a reversing unit (2) and a number of clutches (16–18) to engage the reversing unit (2) in one or the other sense of rotation. At least one of these clutches (16–18) is controlled by a hydraulic pressure unit (25), with a piston (27) which can be moved in a cylinder (28), whereby the seal between the piston (27) and the cylinder (28) is an elastic sealing ring (32), The piston (27) is provided with at least one passage to let hydraulic medium escape under the influence of the centrifugal force, whereby the at least one passage (43) is located in the above-mentioned sealing ring (32).

13 Claims, 2 Drawing Sheets

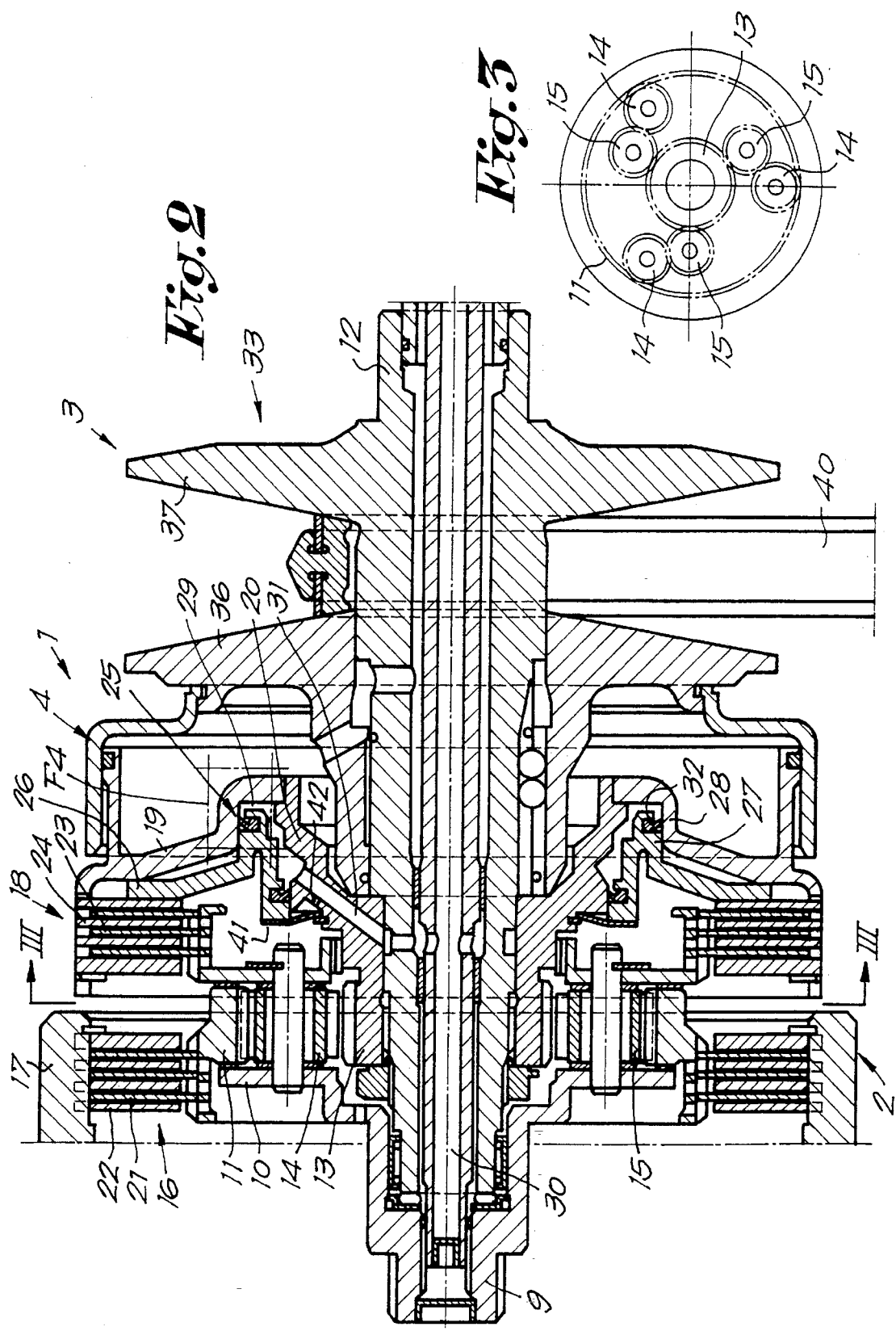

1

TRANSMISSION UNIT FOR MOTOR VEHICLES

BACKGROUND OF THE INVENTION

1. Field of the Invention

The present invention concerns a transmission unit for motor vehicles, in particular a transmission unit of the type which is provided with a continuously variable transmission, a reversing unit and a number of clutches to engage the reversing unit in one or the other sense of rotation, whereby at least one of these clutches is controlled by a hydraulic pressure unit, with a piston which can be moved in a cylinder, whereby the seal between the piston and the cylinder comprises of an elastic sealing ring.

2. Discussion of the Prior Art

The above-mentioned clutches usually contain a forward clutch and a reverse clutch. The use of these clutches has a number of disadvantages, which will be explained hereafter on the basis of the existing situation.

When for example pressure is exerted on the piston of the forward clutch, the forward clutch is closed and the space behind the piston is, logically, entirely filled with hydraulic medium under pressure. In order to make sure that, when the pressure is relieved again, the piston can return to its initial position under the influence of a spring, there is a little tap hole in the piston, also called blow-off hole, such that the hydraulic medium can leave the above-mentioned space. A certain amount of hydraulic medium always remains behind the piston.

In the existing embodiments however, this tap hole is not situated on the largest diameter of the piston. If one subsequently drives in reverse, the shaft and the piston will also rotate, and a centrifugal pressure is built up behind the piston of the forward clutch which makes sure that the forward clutch is closed. Naturally, this causes losses, and since the forward clutch is usually not cooled in this phase, it can even burn.

Due to practical reasons, however, moving the conventional tap hole to a larger diameter is not easy. In order to avoid a shock and yet be able to use a large diameter, several holes are preferably provided along the perimeter, whose total surface, in order to restrict leakage losses, is preferably not larger than the surface of one conventional tap hole. Consequently, these holes have such a small diameter that it is very expensive to provide them in the metal piston.

SUMMARY OF THE INVENTION

The invention aims to provide a solution to this problem.

To this end, the invention has a transmission unit for motor vehicles of the type which is provided with a continuously variable transmission, a reverse unit, and a number of clutches to engage the reversing unit in one or the other sense of rotation, whereby at least one of these clutches is controlled by means of a hydraulic pressure unit, with a piston which can be moved in a cylinder, whereby the sealing between the piston and the cylinder comprises an elastic sealing ring, whereby the piston is provided with means to let hydraulic medium escape under the influence of the centrifugal force, and whereby these means comprise at least one passage in the above-mentioned sealing ring.

According to the most preferred embodiment, the invention will be applied on the forward clutch, but the use of it on the reverse clutch is not excluded.

The above-mentioned passage preferably comprises at least one recess in the sealing.

BRIEF DESCRIPTION OF THE DRAWING

In order to better explain the characteristics of the invention, the following preferred embodiment is given as an example only without being limitative in any way, with reference to the accompanying drawings, in which:

FIG. 2 shows the part which is indicated in FIG. 1 with F2 to a larger scale and as a section;

FIG. 3 shows a schematic section to a smaller scale according to line III—III in FIG. 2;

DETAILED DESCRIPTION OF THE PREFERRED EMBODIMENT

Figure 1:
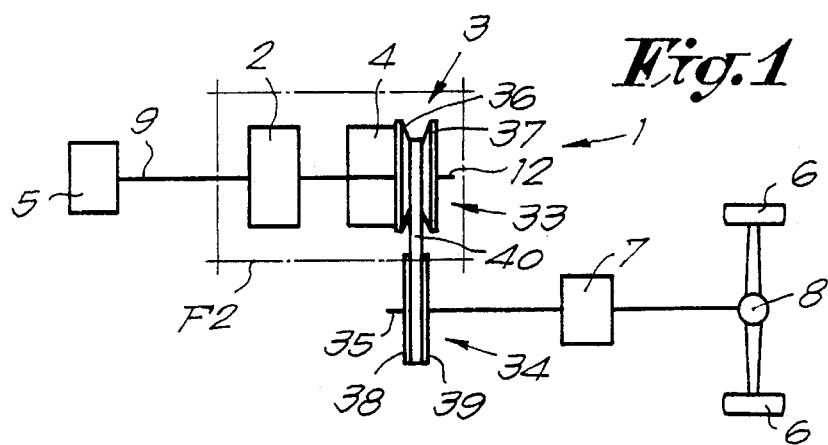
FIG. 1 schematically represents a transmission unit according to the invention.

As indicated in FIG. 1, the invention concerns a transmission unit 1 for a motor vehicle, in particular of the type which is provided with a reversing unit 2 and a continuously variable transmission 3 which can be controlled by means of a pressure cylinder 4.

The reversing unit 2 is driven directly or indirectly by means of a motor 5 and the continuously variable transmission 3 drives the wheels 6 through the interaction of a gear wheel transmission 7 and a differential 8, one and other such that the revolving movement of the wheels 6 can be controlled in a continuously variable manner and can be reversed as desired so as to drive forward or backward.

As represented in FIGS. 2 and 3, the reversing unit usually comprises a planetary set with a planet carrier 10 placed on the ingoing shaft 9, a ring wheel 11, a sun wheel 13 placed on the outgoing shaft 12, planet gears 14 and 15 which are carried by the planet carrier 10, a clutch 16 with which the ring wheel 11 can be held in relation to the frame 17 and a clutch 18 with which the planet carrier 3 can be coupled to the outgoing shaft 11 via parts 19 and 20.

It is clear that by exciting the clutch 16 or the clutch 18 the sense of rotation of the outgoing shaft 11 can be either or not turned in relation to the ingoing shaft 9. The clutch 16 hereby forms the reverse clutch, whereas the clutch 18 forms the forward clutch.

The clutches 16 and 18 are multi-plate clutches. They are formed of plates, 21–22 and 23–24 respectively, which can be pressed together so that they start rotating together under the influence of the frictional force. The pressing is done by means of hydraulic pressure units, of which only the pressure unit 25 is represented in FIG. 2, which controls the clutch 18. This pressure unit 25 includes a press-on element 26 which can be moved by means of a piston 27, which can be moved in a cylinder 28, and which can cooperate with the plates 23 and 24. The pressure unit 25 is excited by filling the space 29 behind the piston 27 with hydraulic medium under pressure, via supply lines 30 and 31. The sealing between the piston 27 and the cylinder 28 is hereby ensured by a sealing ring 32.

The continuously variable transmission 3 comprises of a first pulley 33 on the shaft 12 and a second pulley 34 on a shaft 35 with conical disc halves 36–37 and 38–39, whose disc halves 36 and 39 can move axially, in between which is provided an endless transmission element 40, such that by adjusting the disc halves, by means of the pressure cylinder 4, different running radiuses can be realized for the transmission element 40, so that a continuously variable control becomes possible. The working and exact construction thereof is generally known, so that we do not go deeper into that here.

If the vehicle is driven forward, the clutch 17 is disengaged and the clutch 18 is engaged. The clutch 18 is engaged by creating pressure in the space 29.

In order to make sure that the piston 27, when the pressure in the space 29 is relieved again, can go back, possibly with the help of a weak spring 41, the supply line 31 is usually provided with a tap hole 42.

As already explained in the introduction, this tap hole 42 is not situated on the largest diameter of the piston 27, nor is it possible to provide it on the largest diameter for the reasons mentioned in the introduction.

If, after driving forward, one drives backward, a centrifugal pressure is consequently built up in the existing embodiments, which makes sure that the clutch 18 is again pressed on with a certain force, which causes losses, and, since this clutch 18 is usually not lubricated, can even burn it.

According to the invention, this problem is solved by making use of means to let hydraulic medium escape from the space 29 under the influence of the centrifugal force, which at least comprises at least one passage 43 in the above-mentioned sealing ring 32.

Preferably, several passages 43 will be provided in the sealing ring 32. According to a preferred embodiment, there are at least three. In the example from FIGS. 4 to 7, even four passages 43 have been provided in the sealing ring 32. In the case of two or more passages 43, they are evenly distributed along the perimeter of the sealing ring 32.

As is further represented in the FIGS. 4 to 7, the passages 43 preferably are recesses, which can be semi-circular. Such recesses are advantageous in that they can be easily provided, even with very small tolerances. Such recesses can be made without extra costs as it only requires the use of another mould for die-casting the sealing ring 32.

The recesses preferably extend in the moving direction of the piston 27. Moreover, they are preferably situated on the outer edge of the sealing ring 32. This offers the advantage that possible contaminations which could lead to obstructions of a passage 43 are easily removed by the cleaning action which is created as the piston 27 moves along the wall of the cylinder 28.

Figure 4:
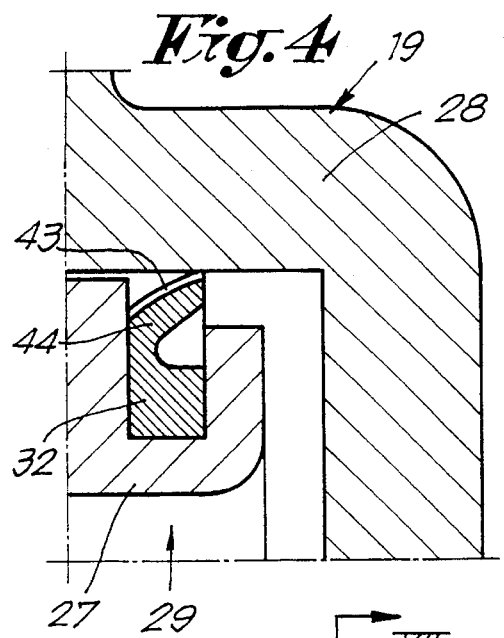
FIG. 4 shows a view of the part which is indicated in FIG. 2 with F4 to a larger scale.
Figure 5:
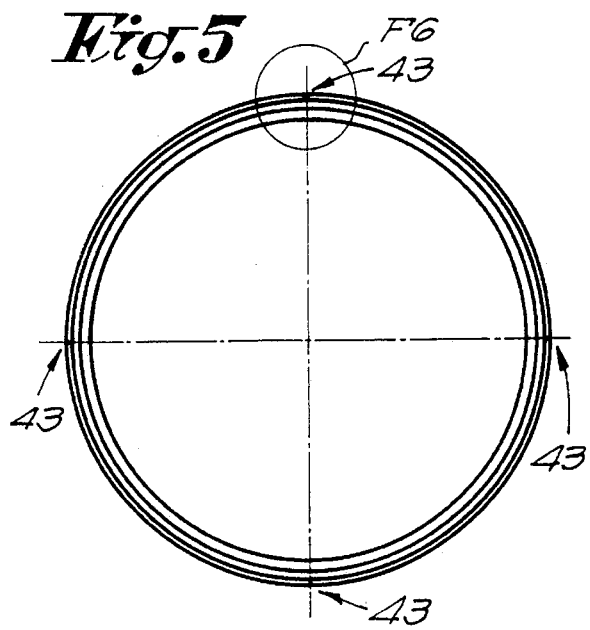
FIG. 5 shows the sealing ring from FIG. 4 to a smaller scale.
Figure 6:
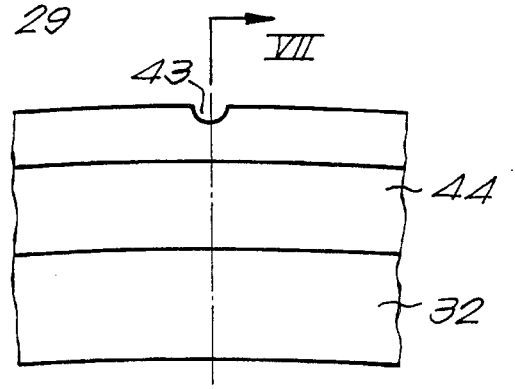
FIG. 6 shows a view of the part which is indicated with F6 in FIG. 5 to a larger scale.
Figure 7:
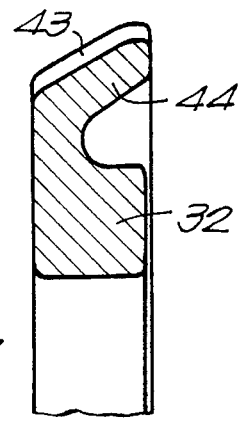
FIG. 7 shows a section according to line VII—VII in FIG. 6.

Preferably, as represented in FIGS. 2, 4 and 7, use is made of a scarfed sealing ring 32, whereby the recesses are provided in the lip 44. This offers the advantage that, on condition that the sealing ring 32 is provided well, the lip 44 of the sealing ring 32 is pressed against the inner wall of the cylinder 28 at high pressures and the passages 43 are squeezed to a larger or lesser extent, whereas at a small pressure, such as the centrifugal pressure, flow is possible.

It is also possible to combine the use of one or several passages 43 with the use of one or several tap holes 42. In this case, the total orifice of the tap holes 42, together with the passages 43, is preferably smaller than or equal to the total orifice of the traditional tap holes in order to restrict the leakage losses.

It is clear that the sealing ring 32 is preferably situated on the outer diameter of the cylinder 28.

The invention is meant in the first place to be applied on the forward clutch, but it is clear that it can also be applied on the reverse clutch, in case this has a similar construction.

The working of the clutch 18 making use of a sealing ring 32 with passages 43 can be easily derived from the figures. In the case where the excitation of the clutch 18 is stopped, the remaining hydraulic medium can escape through the passages 43 thanks to the centrifugal force, so that a pressure build-up is excluded. Moreover, the medium can freely escape between the piston 27 and the cylinder 28.

During the excitation of the clutch 18, a relatively large amount of medium under pressure is led in the space 29, so that leakage losses via the passages 43 and possibly via the tap hole 42 are to be neglected. Moreover, due to the fact that they are provided in the elastic material of the sealing ring 32, the passages 43 are partly or entirely squeezed, so that leakage losses at high pressures are restricted.

The present invention is by no means limited to the embodiments described above and represented in the accompanying drawings; on the contrary, such a transmission unit for motor vehicles can be made in various forms and dimensions while still remaining within the scope of the invention.

I claim:

1. A transmission unit for a motor vehicle comprising:

a continuously variable transmission having a first rotatable drive member;

a reversing unit;

a clutch selectively coupling said reversing unit to said drive member for rotation with said drive member in a first direction of rotation; and a hydraulic pressure unit for controlling the clutch, said hydraulic pressure unit including a cylinder adapted to receive a hydraulic medium and being rotatable with said drive member, a piston movably mounted in said cylinder and separating said cylinder into first and second chambers and an elastic sealing ring located between said piston and said cylinder, said sealing ring including a passage situated to allow the hydraulic medium to travel between said first and second chambers under the influence of centrifugal force caused by the rotation of said cylinder.

2. A transmission unit according to claim 1, wherein the clutch engages the reversing unit in the first direction of rotation for moving the vehicle forward.

3. A transmission unit according to claim 1, wherein the clutch is a multi-plate clutch.

4. A transmission unit according to claim 1, wherein the passage comprises a recess formed in said sealing ring.

5. A transmission unit according to claim 4, wherein the sealing ring has an outer peripheral surface, the recess being located in said outer peripheral surface and extending from said first chamber to said second chamber.

6. A transmission unit according to claim 5, wherein the recess is semicircular.

7. A transmission unit according to claim 1, wherein the sealing ring includes a lip and passage is provided in the lip.

8. A transmission unit according to claim 7, wherein the lip is adapted to press against cylinder as pressure in the hydraulic pressure unit rises.

9. A transmission unit according to claim 1, wherein the sealing ring includes an outer peripheral surface and several passages which are distributed along said outer peripheral surface.

10. A transmission unit according to claim 9, wherein the sealing ring includes at least three passages.

11. A transmission unit according to claim 1, further comprising a tap hole extending through said cylinder for allowing the hydraulic medium to escape under the influence of centrifugal force.

12. A transmission unit according to claim 11, wherein the total cross-sectional area of the passage is smaller than or equal to the cross-sectional area of the tap hole.

13. A transmission unit according to claim 11, wherein said sealing ring includes a plurality of passages and the total cross-sectional area of the plurality of passages is smaller than or equal to the cross-sectional area of the tap hole.

* * * * *